United States Patent
Baxter et al.

(10) Patent No.: US 6,289,500 B1
(45) Date of Patent: Sep. 11, 2001

(54) OBJECT MECHANISM AND METHOD THAT CREATES DOMAIN-NEUTRAL OBJECTS WITH DOMAIN-SPECIFIC RUN-TIME EXTENSIONS IN AN APPROPRIATE COLLECTION

(75) Inventors: Randy Dee Baxter; Brent Allen Carlson; Albert S. Lee, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/148,560

(22) Filed: Sep. 4, 1998

Related U.S. Application Data

(63) Continuation-in-part of application No. 09/038,024, filed on Mar. 11, 1998, now Pat. No. 6,106,569.

(51) Int. Cl.⁷ .................................................. G06F 9/445
(52) U.S. Cl. ................................................................ 717/1
(58) Field of Search ................................. 717/1, 3, 7

(56) References Cited

U.S. PATENT DOCUMENTS

| | | | |
|---|---|---|---|
| 5,504,892 | * | 4/1996 | Atsatt et al. ........................ 395/600 |
| 5,758,153 | * | 5/1998 | Atsatt et al. ........................ 395/614 |
| 5,822,580 | * | 10/1998 | Leung ................................. 395/614 |
| 5,848,246 | * | 12/1998 | Gish ................................. 395/200.58 |
| 5,864,862 | * | 1/1999 | Kriens et al. ........................ 707/103 |
| 5,872,973 | * | 2/1999 | Mitchell et al. ..................... 395/685 |
| 6,016,495 | * | 1/2000 | McKeenan et al. .................. 707/103 |
| 6,016,665 | * | 5/2000 | Bahreman ............................ 705/40 |
| 6,023,578 | * | 2/2000 | Birsan et al. ........................ 395/702 |
| 6,063,128 | * | 5/2000 | Bentley et al. .......................... 703/6 |

* cited by examiner

*Primary Examiner*—Mark R. Powell
*Assistant Examiner*—Michael B. Holmes
(74) *Attorney, Agent, or Firm*—Martin & Associates, L.L.C.; Derek P. Martin

(57) ABSTRACT

In an object oriented computer system, a domain-neutral object is modified with domain-specific run-time extensions to customize the object to a particular domain. A special factory uses the extension identifier to create the domain-neutral object with appropriate extensions in a collection that corresponds to the domain extension. If the special factory is not available, or if a specialized collection associated with the particular extension type has not been previously created, the domain-neutral object with appropriate extensions is created in a default collection. In this manner, an object that is domain-neutral can be customized to a particular domain and created in an appropriate collection for objects of that type.

16 Claims, 8 Drawing Sheets

OBJECT MECHANISM AND METHOD THAT CREATES DOMAIN-NEUTRAL OBJECTS WITH DOMAIN-SPECIFIC RUN-TIME EXTENSIONS IN AN APPROPRIATE COLLECTION

REFERENCE TO PARENT APPLICATION

This application is a Continuation-In-Part of "A Method of Developing a Software System Using Object Oriented Technology", U.S. Ser. No. 09/038,024, filed Mar. 11, 1998, now U.S. Pat. No. 6,106,569 which is incorporated herein by reference.

BACKGROUND OF THE INVENTION

1. Technical Field

This invention generally relates to object oriented programming and more specifically relates to a mechanism and method for instantiating domain-neutral objects with suitable domain-specific run-time extensions in an appropriate collection.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to write a particular software program, such as a software application. One framework that is commercially available from IBM is known as San Francisco, which provides pre-defined classes that allow a user to easily extend the framework to define a custom software application, such as a general ledger or an order processing system. San Francisco defines a special type of domain-neutral object mechanism known as a Hierarchy Level Information Life Cycle Managed Item, referred to herein for the sake of simplicity as an extensible item. An extensible item can be dynamically reconfigured at run-time by adding or deleting domain-specific extensions to the extensible item object. An extensible item that holds a particular primary extension logically becomes an object of the type defined by the primary extension, thereby becoming domain-specific. In this manner the extensible item, which is domain-neutral, can acquire domain-specific extensions that define behavior that allows the extensible item to function as though it were domain-specific itself.

Two considerations come into play in determining how to best create an extensible item. One is whether or not the created object is domain-neutral, and the second is whether or not the created object is placed in an appropriate collection. It would be advantageous to keep the extensible items domain-neutral, which would allow the extensible item to be used as a pure mechanism that knows nothing about any particular domain. It is also desirable to place each extensible item in an appropriate collection when it is created. Different collections are often needed to map data in a collection to an underlying database. This prevents the undue mixing of different types into one collection, thus enabling both efficient layout of various domain-specific database tables (one per primary extension type) and also efficient querying against those tables.

Creating an extensible item using common object oriented techniques has drawbacks. One possible way of creating an extensible item for a particular domain is shown in FIG. 2. A DomainSpecificExtensibleItem class is defined by subclassing from an appropriate DomainInterface class (such as order item interface in an order processing system), and by also subclassing from the ExtensibleItem class. In addition, an ExtensibleItemFactory is subclassed to achieve a DomainSpecificExtensibleItemFactory. The result is a DomainSpecificExtensibleItem class and a DomainSpecificExtensibleItemFactory class that can be used to create the DomainSpecificExtensibleItem objects for a particular domain. The advantage of this approach is that each DomainSpecificExtensibleItem is stored in an appropriate collection, represented by the DomainSpecificExtensibleItemCollection class. The drawback of this approach is that the domain specific extensible item and factory are domain-specific, which means that they no longer function as pure mechanisms, but instead have knowledge about their domain. This approach also causes the need for a different subclass for each type of DomainInterface, which could lead to a large number of new subclasses.

Another way to create an extensible item is shown by the class diagram of FIG. 3. Using this method, the extensible item maintains its domain independence by placing all domain-specific information in the domain extension, but all of the extensible items are created in the same collection, represented by the ExtensibleItemCollectionDefaultForAllExtensibleItems class. Having all of the extensible items in the same collection may make it very difficult to map the data to an existing database table. Without a mechanism for creating mechanism objects that are domain-neutral in appropriate collections, the computer industry will continue to suffer from object oriented frameworks that do not fully take advantage of their potential flexibility and performance.

DISCLOSURE OF INVENTION

In an object oriented computer system, a domain-neutral object is modified with domain-specific run-time extensions to customize the object to a particular domain. A special factory uses the extension identifier to create the domain-neutral object with appropriate extensions in a collection that corresponds to the domain extension. If the special factory is not available, or if a specialized collection associated with the particular extension type has not been previously created, the domain-neutral object with appropriate extensions is created in a default collection. In this manner, an object that is domain-neutral can be customized to a particular domain and created in an appropriate collection for objects of that type.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
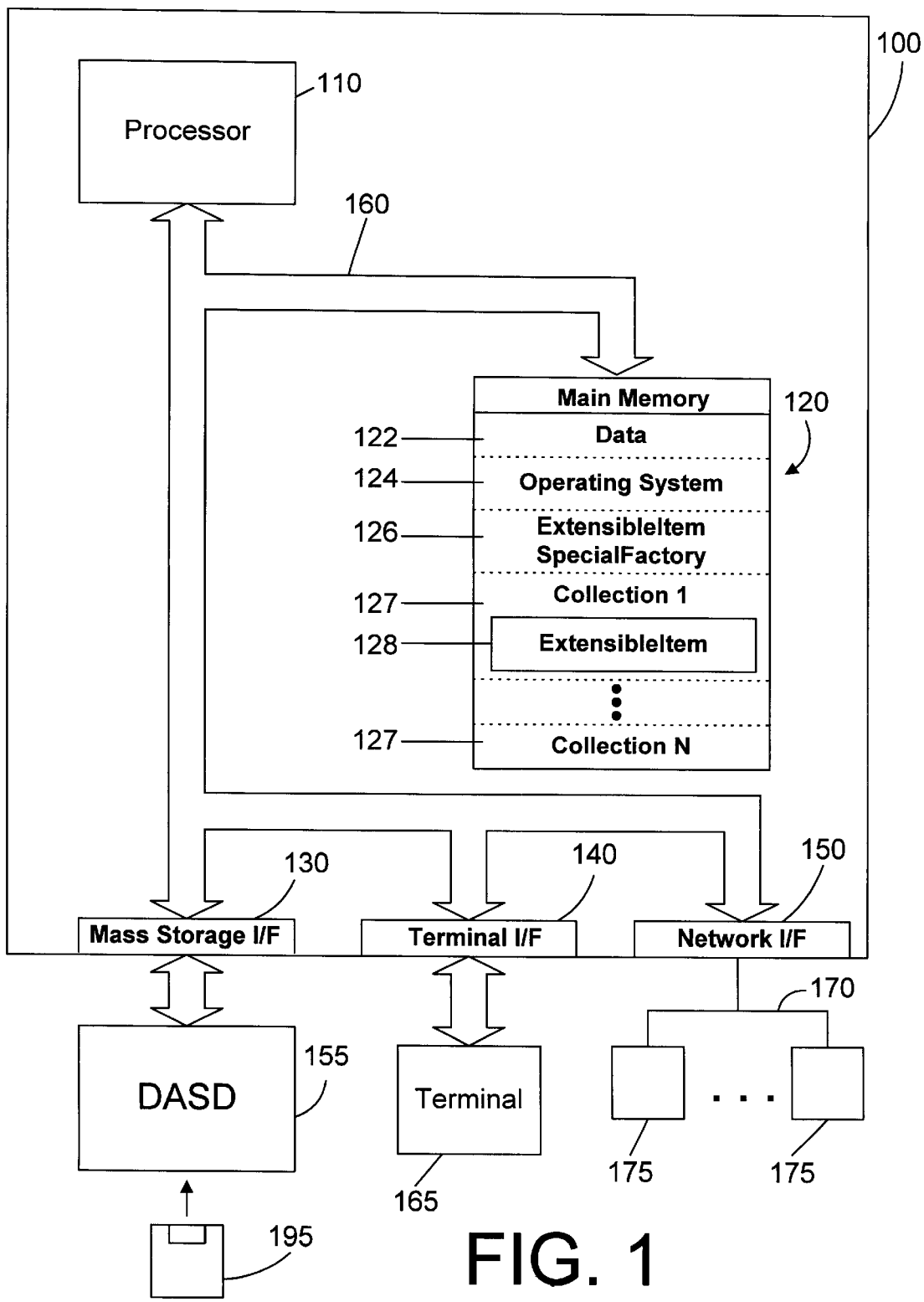
FIG. 1 is a block diagram of an apparatus in accordance with a preferred embodiment of the present invention.
Figure 2:
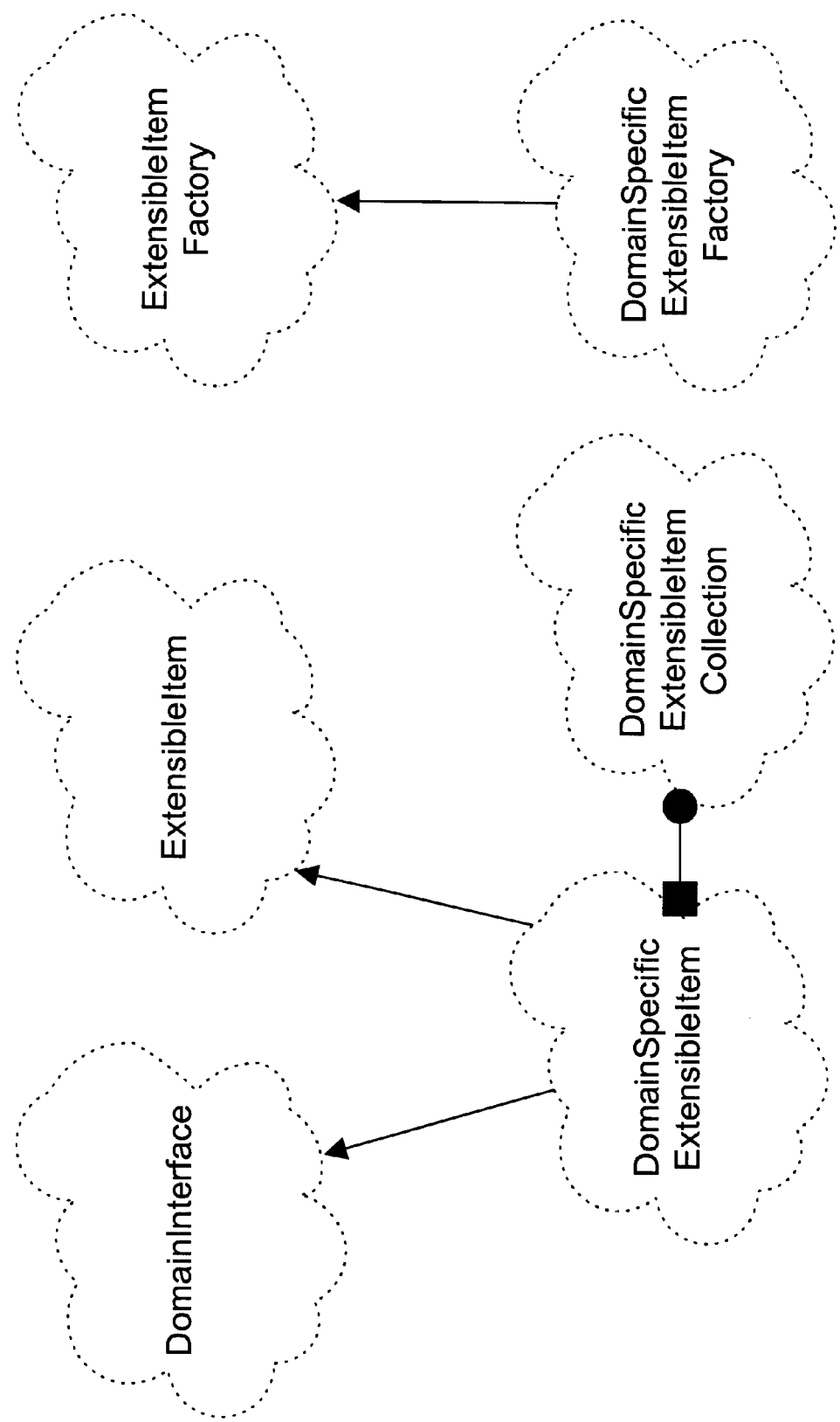
FIG. 2 is class diagram of one possible method for creating extensible item objects in an object oriented system.
Figure 3:
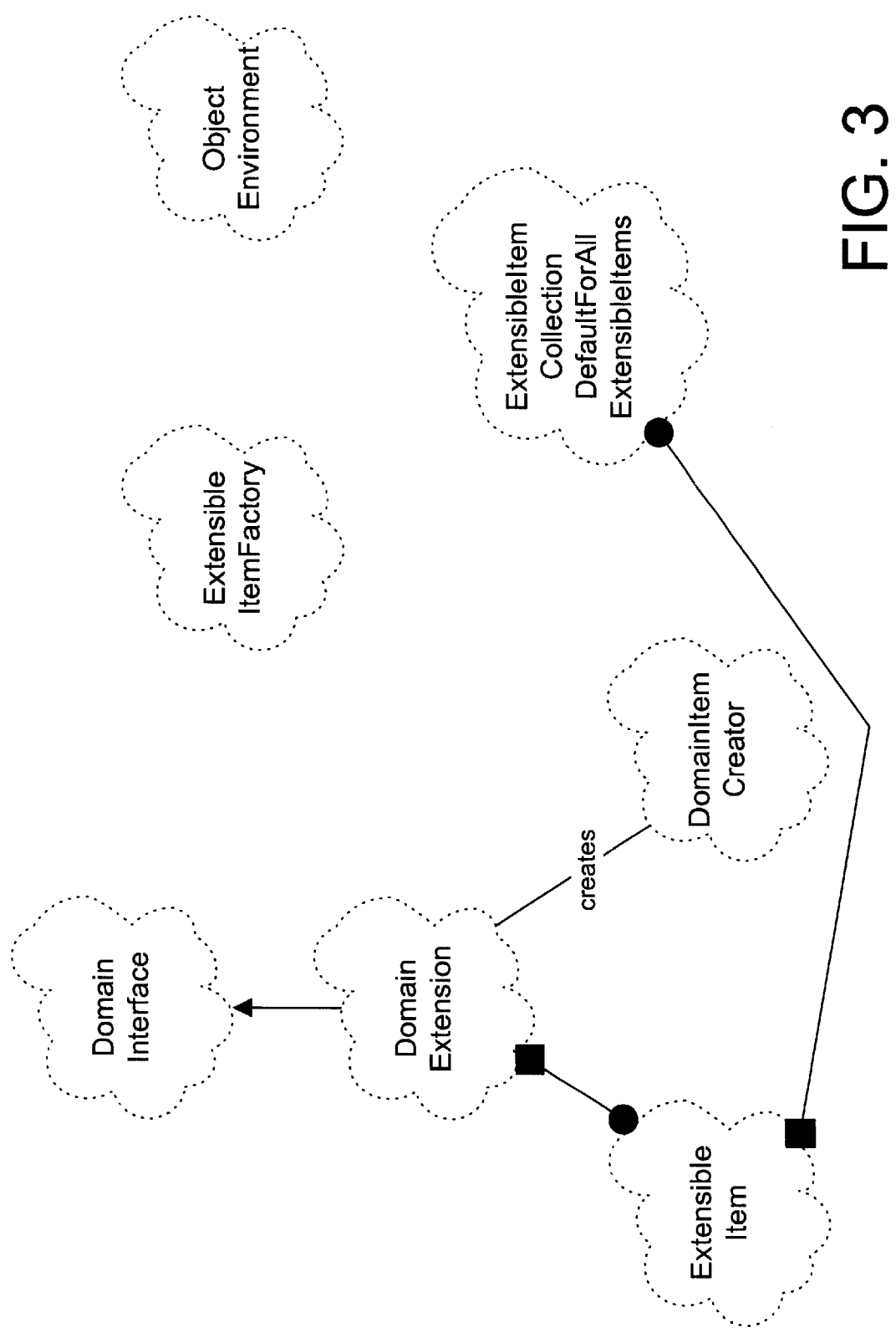
FIG. 3 is a class diagram of another possible method for creating extensible item objects in an object oriented system.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well-defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IBM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An extensible object has a primary extension, and may have one or more additional extensions. An object with a primary extension logically becomes an object of the type defined by the primary extension. Thus, if an object has a primary extension OrderDetail, the object logically appears to be a member of the OrderDetail class. This ability to dynamically modify the behavior of objects at run-time is one of the powerful concepts supported in the San Francisco framework.

Figure 4:
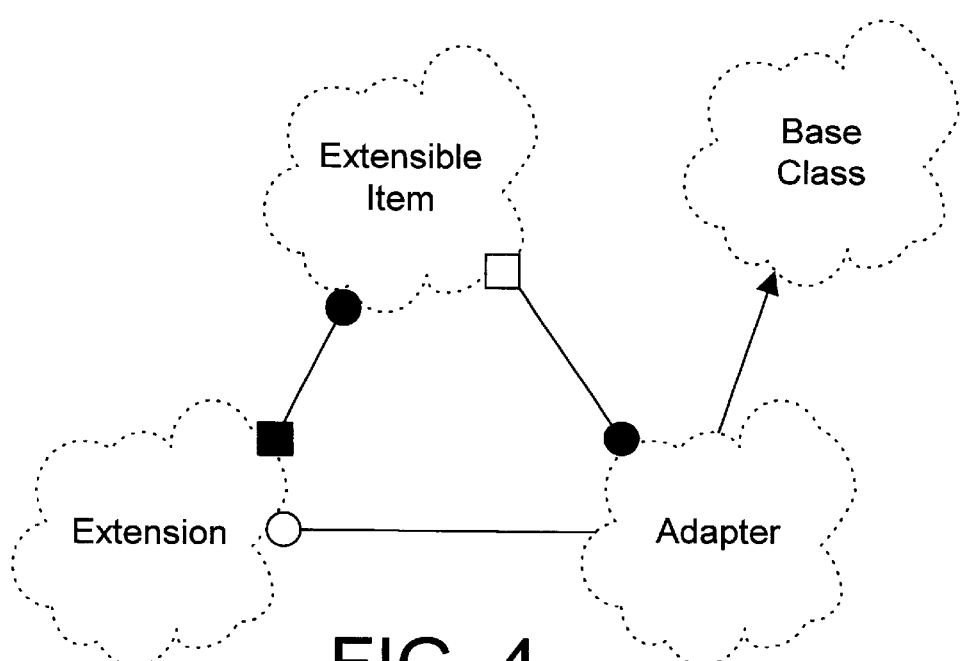
FIG. 4 is a class diagram of an extensible item and its related classes.

The class diagram of FIG. 4 illustrates the concept of dynamic run-time extensions in the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The Extension class has the ability to create or delete one or more adapter objects that are instances of an Adapter class. The Extension class has a "uses" relationship with the Adapter class, while the Adapter class has a "has" relationship with the ExtensibleItem class. The Adapter class inherits from a BaseClass that defines domain-specific behavior. The BaseClass defines a formal interface for the domain behavior that objects of the Extension class add to an ExtensibleItem object The Adapter class is provided to allow an ExtensibleItem object owning an object of the given Extension class to be treated as a true instance of the BaseClass by making public methods implemented by the associated extension. Only methods defined by the Adapter class can be invoked.

Figure 5:
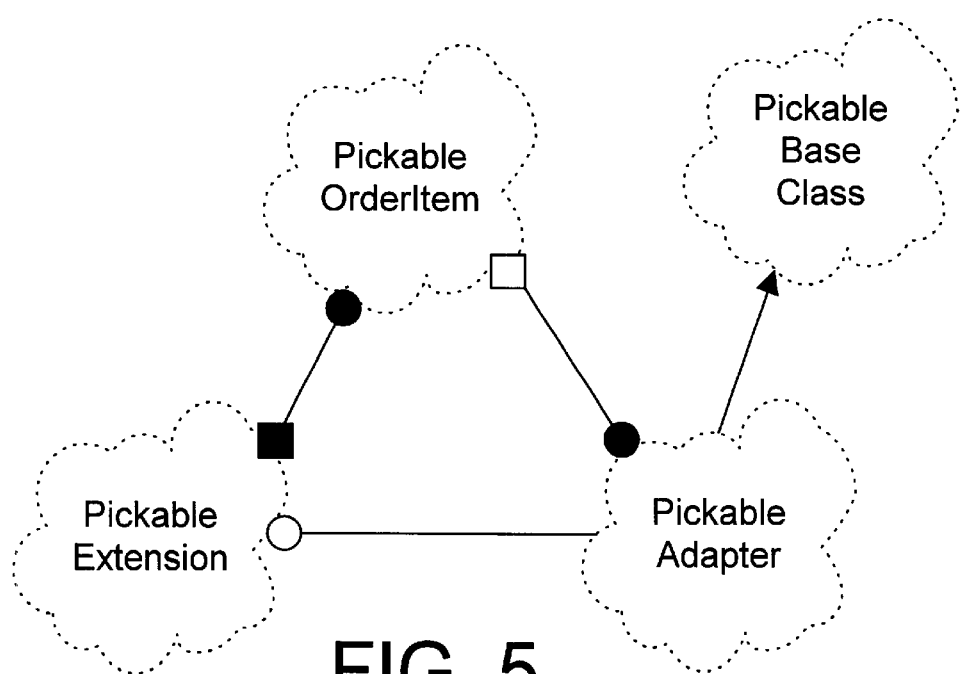
FIG. 5 is a class diagram of one specific example of an extensible item.

A specific example helps to illustrate the concepts of domain-specific run-time extensions to a domain-neutral object. Let's assume there is a need for a "pickable" order item. Referring to FIG. 5, a PickableOrderItem class represents a domain-neutral extensible item, and includes one or more instances of a PickableExtension class, which extend the PickableOrderItem for use in a specific domain. A PickableAdapter class has a reference to the PickableOrderItem class, and supports the interface of the PickableBaseClass. The class configuration of FIG. 4, as illustrated in the specific example of FIG. 5, allows dynamic extensions to be added to and deleted from an extensible item object as the desired function of the object changes.

Figure 6:
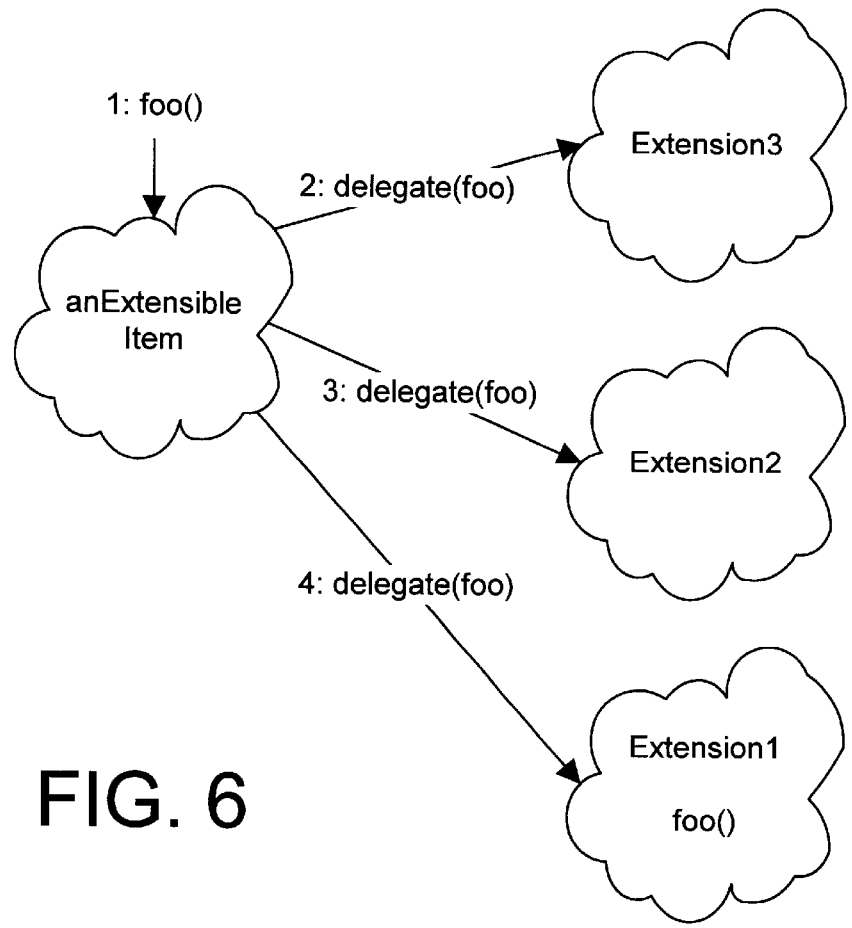
FIG. 6 is an object diagram illustrating the delegation of method calls to extension objects.

An instance of the ExtensibleItem class can service method calls in a number of different ways. Referring to FIG. 6, an instance anExtensibleItem has three associated extensions, Extension3, Extension2, and Extension1. One way for anExtensibleItem to service a method call is to determine which extension can handle the method call, progressing from the newest (Extension3) to the oldest (Extension1). For example, we assume that Extension1 supports a method called "foo", and that "foo" is invoked on anExtensibleItem (step 1). The anExtensibleItem object first delegates the "foo" method to Extension3 (step 2). Extension3 does not, so anExtensibleItem delegates the call to "foo" to the next extension, Extension2 (step 3). Extension2 does not support the "foo" method, so anExtensibleItem delegates the call to "foo" to Extension1 (step 4). Extension1 supports "foo", so Extension1 executes its "foo" method in response to anExtensibleItem delegating "foo" to Extension1 in step 4. Note that the first extension to support the "foo" method will execute its "foo", and other implementations of "foo" in older extensions are therefore not available. This is one way of hiding a method on existing extensions, by providing a newer extension that supports the method. In the alternative, an extension may change itself to fail when a specific method is requested, thereby hiding its own implementation of that method.

As the behavior of an ExtensibleItem is changed by adding or deleting extensions, the ExtensibleItem may have to interrogate several objects to determine the functions that it's interface supports, as shown in FIG. 6. If a method is not supported, the ExtensibleItem may spend a significant amount of processing time to make this determination. Likewise, if a method is implemented in an older interface, the ExtensibleItem may have to unsuccessfully interrogate several extensions before finding one that supports the called method. To improve performance, a Dynamic Virtual Function Table (DVFT) is used to cache the interface information on the ExtensibleItem in a dynamic way. Thus, when a method is invoked, the ExtensibleItem can determine from its Dynamic Virtual Function Table whether the method is supported, and if so, by what extension. The Dynamic Virtual Function Table thus improves system performance by caching interface information in the ExtensibleItem itself.

The information in the Dynamic Virtual Function Table may be maintained either as extensions are added to or removed from the ExtensibleItem, or may be built as the extensions are used. In the latter case, as a method call is delegated to an extension for the first time, its methods are added to the Dynamic Virtual Function Table. This solution is dynamic by maintaining cached information as the extensions are added and removed from the ExtensionItem.

Figure 7:
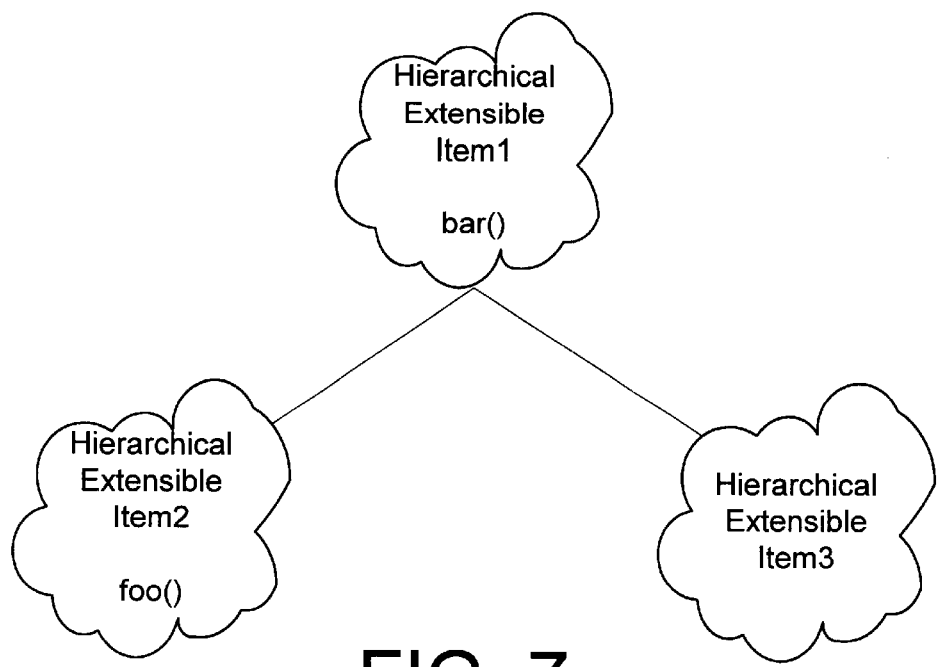
FIG. 7 is an object tree for illustrating the delegation of method calls to parent and children objects in an object tree.

If an ExtensibleItem object is part of a tree structure of objects, where it is attached to other ExtensibleItem objects as a parent and/or a child, the method call on one ExtensibleItem object may be delegated either upwards or downwards in the tree structure. For example, referring to FIG. 7, a very simple tree structure is provided to illustrate the delegation of method calls from one object in a tree structure to another. We assume that a class HierarchicalExtensibleItem is a subclass of ExtensibleItem that enhances ExtensibleItem by adding behavior to explicitly allow invoking methods in either a "drill up" or "drill down" fashion. HierarchicalExtensibleItem1 is an instance of the HierarchicalExtensibleItem class at the top level of the tree, with two children objects HierarchicalExtensibleItem2 and HierarchicalExtensibleItem3 that are also instances of the HierarchicalExtensibleItem class. We assume that HierarchicalExtensibleItem1 supports the method "bar", and that HierarchicalExtensibleItem2 supports the method "foo". This means that these objects have one or more extensions that support these methods. In the case of "drill up", either method "foo" or "bar" could be invoked on HierarchicalExtensibleItem2. The invocation of the "foo" method on HierarchicalExtensibleItem2 delegates to the "foo" method on HierarchicalExtensibleItem2, while the invocation of "bar" delegates the "bar" up the tree (drill up) to HierarchicalExtensibleItem1. Invoking "foo" on HierarchicalExtensibleItem1 or HierarchicalExtensibleItem3 using "drill up" results in an error. When invoking a method using "drill down", if the method is found on a given HierarchicalExtensibleItem, the delegation will be to that method only, otherwise it will be invoked in "drill down" fashion (which may involve recursion) on all children of the given HierarchicalExtensibleItem, accumulating the results of the multiple method calls, if necessary. Thus, if "bar" is invoked on HierarchicalExtensibleItem1 using "drill down", it would delegate to the "bar" method on HierarchicalExtensibleItem1 and stop there. However, if "foo" were called on HierarchicalExtensibleItem1 using "drill down", the call would be delegated to "foo" on HierarchicalExtensibleItem2 and would then continue on to HierarchicalExtensibleItem3 (which would have no effect in the specific example of FIG. 7), and stop there. This concept of upwards and downwards delegation of method calls can be extended indefinitely throughout a tree structure of ExtensibleItems.

Extensible items thus provide a powerful and dynamic way to change the interface for an object at run-time so the object can acquire and tailor its domain-specific behavior as required. The concept of extensible items discussed above is the foundation upon which the present invention is built.

2. Detailed Description

According to a preferred embodiment of the present invention, an object mechanism and method provide for creating domain-neutral objects with domain-specific run-time extensions in appropriate collections. The object itself is initially domain-neutral, but extensions are dynamically added at run-time so the object has an interface required by its domain.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a special factory 126, and multiple collections 127 in accordance with the preferred embodiment. An extensible item object 128 is shown residing in a collection. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, special factory 126, and multiple collections 127 (including extensible item object 128) are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language. Special factory 126 is shown in FIG. 1 as an ExtensibleItemSpecialFactory, which simply means that this particular special factory is used to create ExtensibleItem objects (such as ExtensibleItem object 128). The special factory 126 creates an ExtensibleItem object 128 in the appropriate collection 127. Note that the terms "object" and "instance" are used interchangeably herein. ExtensibleItem objects that have a corresponding collection are stored in that collection. For any ExtensibleItem that does not have a corresponding collection, the new ExtensibleItem is created in a default collection.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 8:
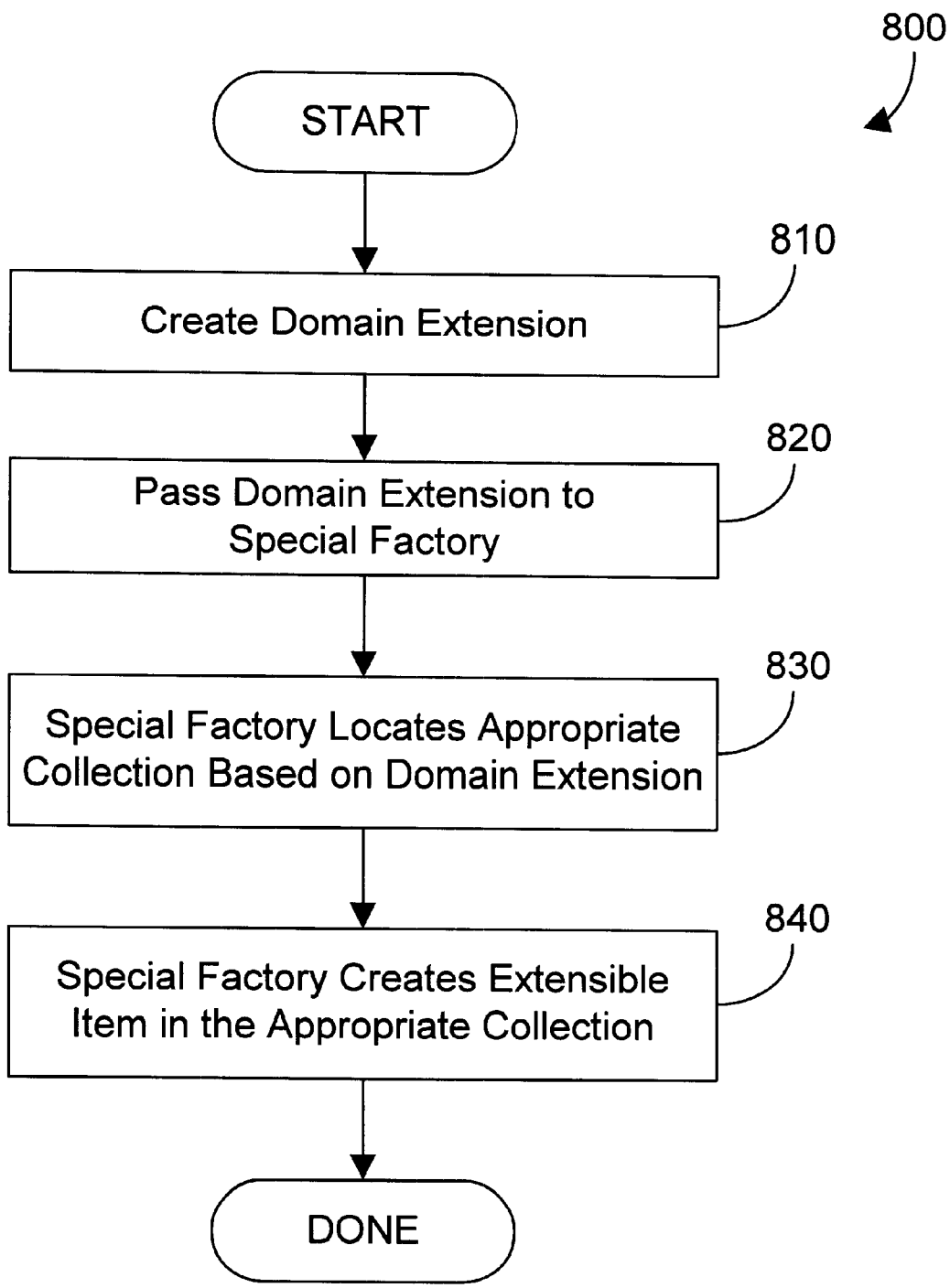
FIG. 8 is a flow diagram showing the steps in creating a domain-neutral extensible item object in accordance with the preferred embodiments.

Referring to FIG. 8, a method 800 creates a specific type of object referred to herein as extensible item objects in a corresponding collection in accordance with a preferred embodiment. Method 800 starts by creating a domain extension (step 810). A domain extension is used to customize a domain-neutral extensible item object to achieve domain-specific function from the object. Next, the domain extension that was created in step 810 is passed to a special factory (step 820). The special factory uses the domain extension to locate an appropriate collection where the new extensible item object should be created (step 830), and creates the new extensible item object in the appropriate collection (step 840).

Figure 9:
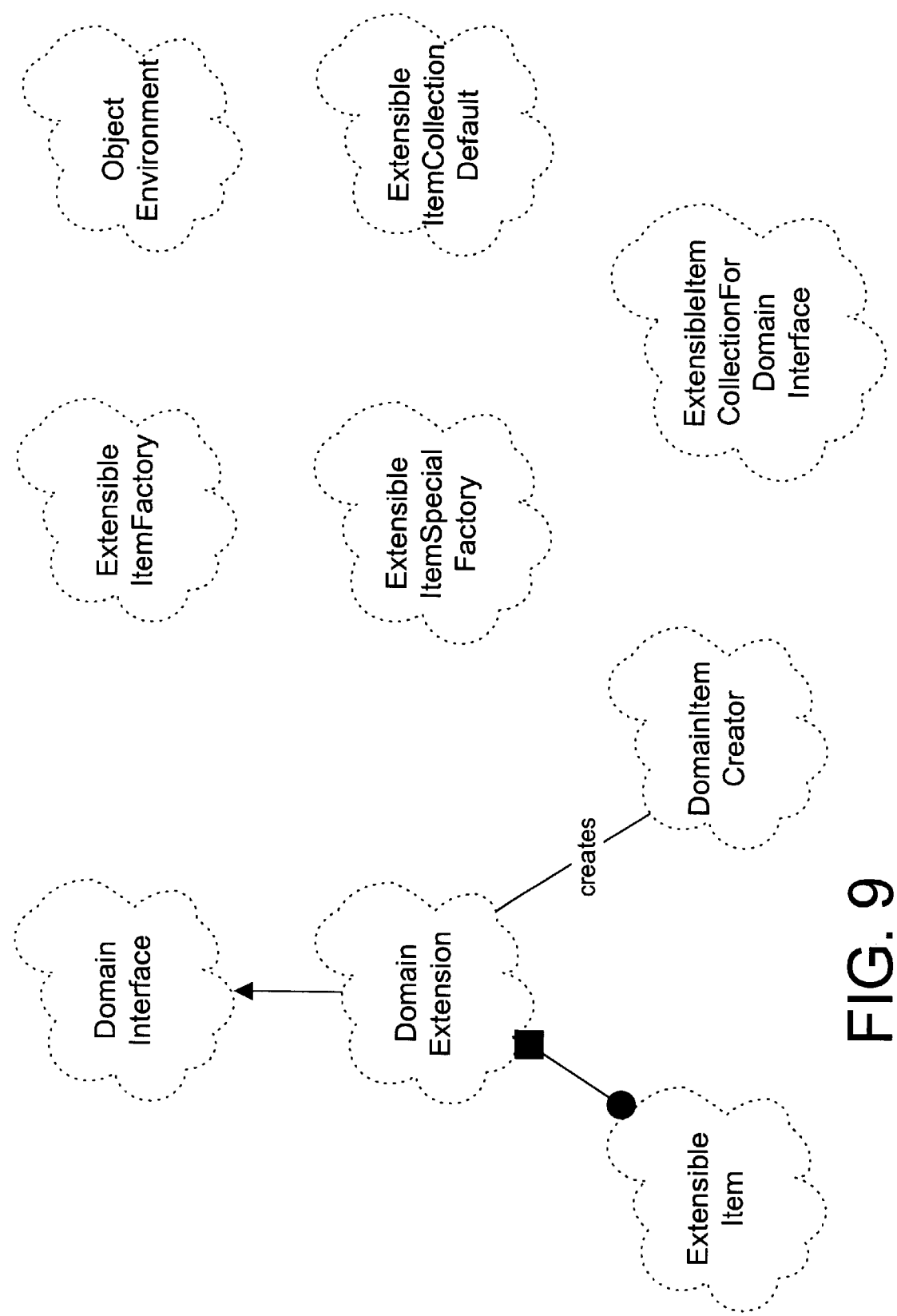
FIG. 9 is a class diagram showing the classes used to create domain-neutral objects in the proper collection.

Referring to FIG. 9, a class diagram shows the various components needed for the preferred embodiment of the invention. DomainInterface is an interface that represents any domain-specific interface that introduces methods that are required for a particular business domain. For example, in an order processing domain, an order line detail is one example of a suitable item that could correspond to the DomainInterface class. DomainInterface is just an interface, not a concrete class. There can be many different types of DomainInterfaces (such as picking, shipping, orderline, etc.)

ExtensibleItem is a domain-neutral mechanism class that provides the existence for itself and any extension class that it owns. While it is actually of type ExtensibleItem, it is logically of the type of primary extension it owns. ExtensibleItem provides the functions needed to interact with other business objects and also works with the underlying system to provide functions such as data persistence. It owns its extension objects. Note that there is only the need for one type of ExtensibleItem regardless of how many types of DomainInterfaces and DomainExtensions there are.

DomainExtension defines a class that must be owned by an ExtensibleItem. DomainExtension inherits the DomainInterface and implements the methods to define a domain-specific class. When DomainExtension is owned by an ExtensibleItem as the primary extension, the ExtensibleItem logically becomes a domain object (such as an order line detail). While the DomainExtension of FIG. 9 is shown directly inheriting the DomainInterface class for the sake of simplicity, one skilled in the art will recognize that the present invention applies as well to extensions that indirectly implement domain-specific information (such as the Extension class of FIG. 4 using an Adapter, which in turn implements the domain-specific information).

DomainItemCreator is a class that creates a DomainExtension class. DomainItemCreator could be called by a client program such as an order creation application.

ExtensibleItemFactory is a standard factory object that creates all ExtensibleItems (and any owned extensions) in the default collection. Before it creates the ExtensibleItem it will look for a special factory that it can delegate to. There is only need for one ExtensibleItemFactory.

ExtensibleItemSpecialFactory is a class that knows how to obtain information from an extension and then determine where to create the instance of ExtensibleItem. An ExtensibleItemSpecialFactory object has no domain-specific knowledge, but instead will obtain any domain-related information, such as the name of the extension, from the extension.

ObjectEnvironment is a class that represents the object infrastructure that provides basic services such as persistence, naming and locking. It is also where an object would go to find a special factory.

ExtensibleItemCollectionDefault is a persistent collection that will contain any instance of ExtensibleItem without regard to its extension type. ExtensibleItemCollectionForDomainInterface is a persistent collection that will contain the instances of ExtensibleItem with an extension of type DomainInterface. There may be one of these for each type of DomainInterface.

Figure 10:
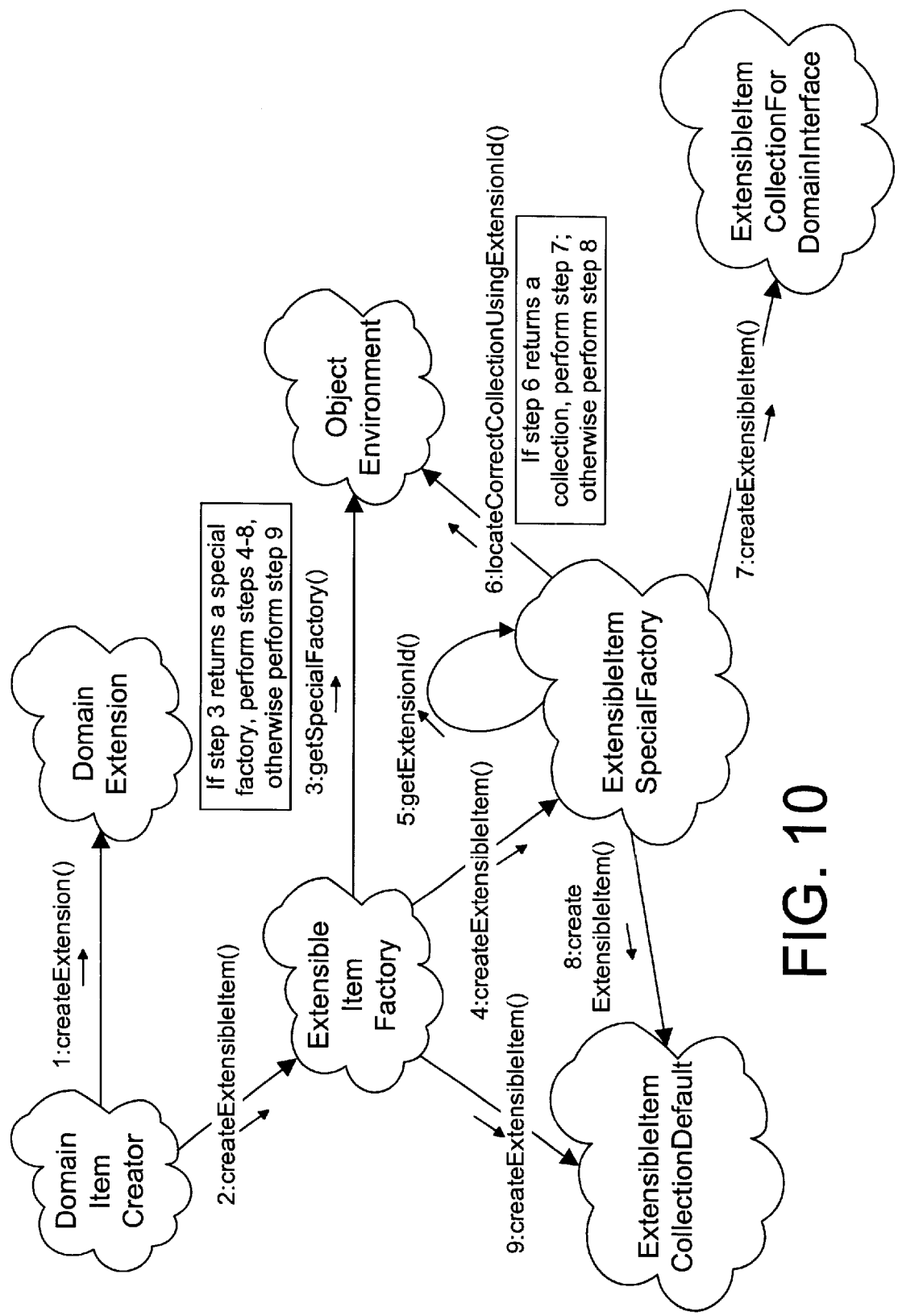
FIG. 10 is an object diagram showing the creation of an extensible item object within the proper collection in accordance with the preferred embodiments.

The operation of the classes and interfaces in FIG. 9 is best understood with reference to the object diagram in FIG. 10. A DomainItemCreator object is generally called by a client program when a new domain extension is needed. DomainItemCreator invokes the createExtension( ) constructor method, passing domain parameters that are required (such as a quantity to pick) (step 1). There can be a single DomainItemCreator for each type of domain interface, or there may be a single DomainItemCreator that creates all extensions. A DomainExtension object is then instantiated. The DomainItemCreator object then invokes the createExtensibleItem( ) constructor method on the ExtensibleItemFactory (step 2), passing the DomainExtension. ExtensibleItemFactory invokes the getSpecialFactory( ) method on the ObjectEnvironment object, passing the name of the ExtensibleItemFactory as a parameter (step 3). The ObjectEnvironment then determines whether there is a special factory that should be used in place of the default factory. If there is a corresponding special factory, that factory is returned to ExtensibleItemFactory, which delegates the creation of the ExtensibleItem to the special factory. For the example in FIG. 10, we assume that the call getSpecialFactory( ) in step 3 returns the ExtensibleItemSpecialFactory object. In response, the ExtensibleItemFactory object delegates the creation of the DomainExtension to the special factory by invoking the createExtensibleItem( ) method on the ExtensibleItemSpecialFactory object, passing the DomainExtension as a parameter (step 4).

The ExtensibleItemSpecialFactory object then invokes its getExtensionId( ) method (step 5), which returns an ExtensionId. ExtensibleItemSpecialFactory then invokes the locateCorrectCollectionUsingExtensionId( ) method, passing the ExtensionId as a parameter (step 6). In response, the ObjectEnvironment returns a reference to the collection that corresponds to the ExtensionId passed to it, or null if an appropriate collection is not found. If a non-null value is returned, the ExtensibleItemSpecialFactory then has access to the appropriate collection, which is ExtensibleItemCollectionForDomainInterface for the example in FIG. 10. ExtensibleItemSpecialFactory then invokes the createExtensibleItem( ) method on that class (step 7), which causes the ExtensibleItem to be instantiated in the appropriate collection. If null is returned in step 6, the ExtensibleItemSpecialFactory then invokes the createExtensibleItem( ) constructor method on the default collection (step 8).

Note that steps 4–7 are performed if step 3 returns a special factory, otherwise the ExtensibleItemFactory object invokes the createExtensibleItem( ) constructor method on the default collection, causing the ExtensibleItem object to be created in the default collection (step 9). For the specific example of FIG. 10, the default collection is ExtensibleItemCollectionDefault. Thus, if no special factory is available, the extensible item will be created in the default collection.

The classes, objects and methods that create extensible item objects in accordance with the present invention collectively comprise a means for creating a domain-neutral object in a particular collection. The present invention overcomes the disadvantages from conventional methods of creating a domain-neutral object by allowing the domain-neutral object to maintain its domain neutrality while still creating it in an appropriate collection.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a plurality of collections residing in the memory; and
   an object mechanism residing in the memory that creates a domain-neutral object with at least one domain-specific run-time extension in an appropriate one of the plurality of collections.

2. The apparatus of claim 1 wherein the object mechanism comprises a special factory that is invoked to instantiate objects of the type of the domain-neutral object.

3. The apparatus of claim 1 wherein the object mechanism comprises at least one special factory corresponding to the plurality of collections, one special factory being invoked to create the domain-neutral object in at least one corresponding collection.

4. The apparatus of claim 1 wherein all objects of the type of the domain-neutral object are created in the appropriate one of the plurality of collections.

5. An apparatus comprising:
   a memory;
   means residing in the memory for creating a domain-neutral object with at least one domain-specific run-time extension in an appropriate collection.

6. A method for creating a domain-neutral object with at least one domain-specific run-time extension in an appropriate collection, the method comprising the steps of:
   creating the domain-specific run-time extension;
   creating the domain-neutral object with the domain-specific run-time extension in a collection corresponding to the domain-specific run-time extension.

7. The method of claim 6 further comprising the steps of:
   passing the domain-specific run-time extension to a special factory;
   locating the collection corresponding to the domain-specific run-time extension;
   wherein the step of creating the domain-neutral object comprises the step of the special factory creating the domain-neutral object with the at least one domain-specific run-time extension in the collection corresponding to the domain-specific run-time extension.

8. A method for creating a domain-neutral object with at least one domain-specific run-time extension in an appropriate collection, the method comprising the steps of:

creating a domain extension object corresponding to the domain-specific run-time extension;

passing the domain extension object to a factory;

the factory determining whether there is a special factory defined that corresponds to the domain extension object;

if there is a special factory corresponding to the domain extension object, performing the steps of:

the special factory determining the appropriate collection corresponding to the domain extension object; and the special factory creating the domain-neutral object with the at least one domain-specific run-time extension in the appropriate collection;

if there is no special factory corresponding to the domain extension object, performing the step of:

the factory creating the domain-neutral object with the at least one domain-specific run-time extension in a default collection, the default collection comprising the appropriate collection for all domain extension objects that do not have a corresponding collection defined.

9. The method of claim 8 wherein the appropriate collection comprises a special collection specifically corresponding to the domain extension object.

10. The method of claim 8 wherein the appropriate collection comprises the default collection if no special collection specifically corresponding to the domain extension object exists.

11. A program product comprising:

a domain-neutral object mechanism for instantiating domain-neutral objects with domain-specific run-time extensions in an appropriate collection; and signal bearing media bearing the domain-neutral object mechanism.

12. The program product of claim 11 wherein the signal bearing media comprises recordable media.

13. The program product of claim 11 wherein the signal bearing media comprises transmission media.

14. The program product of claim 11 wherein the object mechanism comprises a special factory that is invoked to instantiate objects of the type of the domain-neutral object.

15. The program product of claim 11 wherein the object mechanism comprises at least one special factory corresponding to the plurality of collections, one special factory being invoked to create the domain-neutral object in at least one corresponding collection.

16. The program product of claim 11 wherein all objects of the type of the domain-neutral object are created in the appropriate one of the plurality of collections.

* * * * *